(12) United States Patent
Fu et al.

(10) Patent No.: US 11,290,663 B2
(45) Date of Patent: Mar. 29, 2022

(54) THERMAL IMAGE SENSING SYSTEM AND THERMAL IMAGE SENSING METHOD

(71) Applicant: Industrial Technology Research Institute, Hsinchu (TW)

(72) Inventors: Han-Kuei Fu, New Taipei (TW); Hsueh-Chih Chang, Changhua County (TW); Shih-Yi Wen, Hsinchu (TW); Hung-Lieh Hu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 82 days.

(21) Appl. No.: 16/748,724

(22) Filed: Jan. 21, 2020

(65) Prior Publication Data

US 2020/0252558 A1    Aug. 6, 2020

Related U.S. Application Data

(60) Provisional application No. 62/799,717, filed on Jan. 31, 2019.

(30) Foreign Application Priority Data

Oct. 4, 2019 (TW) .................................. 108136115

(51) Int. Cl.
*H04N 5/33* (2006.01)
*G01J 5/00* (2006.01)
(Continued)

(52) U.S. Cl.
CPC ............ *H04N 5/332* (2013.01); *G01J 5/0003* (2013.01); *G01J 5/0825* (2013.01); *G01J 5/20* (2013.01);
(Continued)

(58) Field of Classification Search
USPC ........................................................ 348/165
See application file for complete search history.

(56) References Cited

U.S. PATENT DOCUMENTS 8,374,438 B1 * 2/2013 Wagner .................. G06T 7/001
  382/209
9,366,575 B2    6/2016 Itoh et al.
(Continued)

FOREIGN PATENT DOCUMENTS

CN     103604504     2/2014
CN     105486409     4/2016
(Continued)

OTHER PUBLICATIONS

Tan, Qiaofeng et al., "6.4 Application of Cylindrical Vector Beam in Material Processing," Laser Beam Binary Optical Transformation and Application Thereof, with English translation thereof, Nov. 30, 2016, pp. 230-231.
(Continued)

*Primary Examiner* — Christopher S Kelley
*Assistant Examiner* — Ana Picon-Feliciano
(74) *Attorney, Agent, or Firm* — JCIPRNET (57) ABSTRACT

A thermal image sensing system including at least one thermal sensor, at least one light sensor, an image identification module, a storage module and a computing module is provided. The thermal sensor senses thermal radiation emitted by an object and generates a thermal radiation image signal correspondingly. The light sensor senses visible light reflected by the object and generates at least one visible light image signal correspondingly. The image identification module receives the visible light image signal generated by the light sensor and determines a material of the object according to the at least one visible light image signal. The storage module stores a radiation coefficient of the material of the object. The computing module calculates a surface (Continued)

temperature of the object according to the radiation coefficient of the material of the object and the thermal radiation emitted by the object. A thermal image sensing method is also provided.

3 Claims, 7 Drawing Sheets

(51) Int. Cl.
    *G01J 5/08* (2006.01)
    *G06N 20/00* (2019.01)
    *G01J 5/20* (2006.01)

(52) U.S. Cl.
    CPC ...... *G06N 20/00* (2019.01); *G01J 2005/0077* (2013.01); *G01J 2005/202* (2013.01)

(56) References Cited

U.S. PATENT DOCUMENTS

| | | | | |
|---|---|---|---|---|
| 2010/0085453 | A1* | 4/2010 | Oh | H04N 9/04559 348/294 |
| 2011/0227041 | A1 | 9/2011 | Cho | |
| 2016/0041038 | A1* | 2/2016 | Geiger | G01J 5/0806 250/338.1 |
| 2016/0045291 | A1* | 2/2016 | Verker | G02B 23/2446 356/364 |
| 2019/0003984 | A1* | 1/2019 | Kester | G06K 9/00771 |
| 2019/0273856 | A1* | 9/2019 | Hirasawa | H04N 5/225 |

FOREIGN PATENT DOCUMENTS

| | | |
|---|---|---|
| CN | 103335722 | 8/2016 |
| CN | 208505474 | 2/2019 |
| TW | M309294 | 4/2007 |
| TW | I607276 | 12/2017 |
| TW | M569679 | 11/2018 |

OTHER PUBLICATIONS

"Office Action of China Counterpart Application", dated Feb. 5, 2021, p. 1-p. 7.

Gabriel Schwartz, et al., "Recognizing Material Properties from Images." arXiv:1801.03127, Jan. 9, 2018, pp. 1-14.

Ce Liu, et al., "Exploring Features in a Bayesian Framework for Material Recognition." 2010 IEEE Computer Society Conference on Computer Vision and Pattern Recognition, Jun. 13-18, 2010, pp. 1-8.

"Office Action of Taiwan Counterpart Application", dated Jul. 1, 2020, p. 1-p. 4.

* cited by examiner

| P | S | P | S | P | S |
|---|---|---|---|---|---|
| S | P | S | P | S | P |
| P | S | P | S | P | S |
| S | P | S | P | S | P |
| P | S | P | S | P | S |
| S | P | S | P | S | P |

| P | P+S | P | P+S | P | P+S |
|---|---|---|---|---|---|
| P+S | S | P+S | S | P+S | S |
| P | P+S | P | P+S | P | P+S |
| P+S | S | P+S | S | P+S | S |
| P | P+S | P | P+S | P | P+S |
| P+S | S | P+S | S | P+S | S |

THERMAL IMAGE SENSING SYSTEM AND THERMAL IMAGE SENSING METHOD

CROSS-REFERENCE TO RELATED APPLICATION

This application claims the priority benefit of U.S. provisional application Ser. No. 62/799,717, filed on Jan. 31, 2019 and Taiwan application no. 108136115, filed on Oct. 4, 2019. The entirety of the above-mentioned patent applications is hereby incorporated by reference herein and made a part of this specification.

TECHNICAL FIELD

The technical field relates to an image sensing system and an image sensing method, and in particular, to a thermal image sensing system and a thermal image sensing method.

BACKGROUND

A traditional thermal image sensing system senses energy radiated by an object primarily through a thermal sensor. The energy radiated by the object is a function of a temperature and a radiation coefficient. Since most of non-metal substances have a radiation coefficient greater than that of most of metal substances, in a thermal image shot by the thermal image sensing system, if the radiation coefficient of a metal substance is not corrected, a surface temperature of the metal substance will be underestimated a lot.

SUMMARY

Embodiments of the disclosure provide a thermal image sensing system and a thermal image sensing method, which may correct a surface temperature of a metal sub stance.

The thermal image sensing system of the embodiment of the disclosure includes at least one thermal sensor, at least one light sensor, an image identification module, a storage module and a computing module. The at least one thermal sensor senses thermal radiation emitted by an object and generates a thermal radiation image signal correspondingly. The at least one light sensor senses visible light reflected by the object and generates at least one visible light image signal correspondingly. The image identification module receives the at least one visible light image signal generated by the at least one light sensor and determines a material of the object according to the at least one visible light image signal. The storage module stores a radiation coefficient of the material of the object. The computing module calculates a surface temperature of the object according to the radiation coefficient of the material of the object and the thermal radiation emitted by the object.

The thermal image sensing method of the embodiment of the disclosure includes the following steps: sensing thermal radiation emitted by an object and generating a thermal radiation image signal correspondingly; sensing visible light reflected by the object and generating at least one visible light image signal correspondingly; determining a material of the object according to the at least one visible light image signal; determining a radiation coefficient of the material of the object according to the material of the object; and calculating a surface temperature of the object according to the radiation coefficient of the material of the object and the thermal radiation emitted by the object.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DETAILED DESCRIPTION OF DISCLOSED EMBODIMENTS

The directional terms mentioned in the implementations, for example, "above", "below", "front", "back", "left", and "right", refer to the directions in the accompanying drawings. Therefore, the directional terms are only used for description instead of limiting the disclosure.

In the accompanying drawings, the drawings illustrate general features of methods, structures, and/or materials used in the particular exemplary embodiments. However, the drawings should not to be interpreted as defining or limiting the scope or nature of the exemplary embodiments. For example, relative sizes, thicknesses and positions of film layers, regions, and/or structures may be reduced or enlarged for clarity.

In the implementations, same or similar reference numerals are used to indicate same or similar components, and details may be omitted. In addition, features in different exemplary embodiments may be combined with each other as long as no conflict occurs, and simple equivalent changes and modifications made in accordance with the specification or the claims still fall within the scope of this patent.

Terms such as "first" and "second" used in the specification or the claims are used to name discrete components or to distinguish between different embodiments or ranges, and are not intended to define the upper or lower limit of the number of components or the manufacturing order or setting order of components. Furthermore, one component/film layer being disposed on (or above) another component/film layer may include two cases, that is, there are additional components/film layers between the two components/film layers or there are no additional components/film layers between the two components/film layers. In other words, the component/film layer may be disposed directly or indirectly on (or above) the another component/film layer. On the other hand, the component/film layer being disposed directly on (or above) the another component/film layer indicates that the two components/film layers are in contact with each other and there are no additional components/film layers between the two components/film layers.

In this text, a thermal image sensing system is suitable for acquiring a thermal image of an object (which may also be referred to as an object to be tested). The thermal image represents an image of thermal radiation emitted by a surface of the object. According to the blackbody radiation law, all objects with temperatures above absolute zero may emit a thermal radiation (such as infrared radiation), and energy radiated by the object increases with the increase of the temperatures. Therefore, a surface temperature of the object may be known according to the thermal image of the object.

According to the Stefan-Boltzmann law, as shown in Formula 1, the total energy E radiated per unit time by a unit area of the surface of one object is a function of an absolute temperature T and a radiation coefficient ε (a radiation coefficient of a blackbody), and σ is a Stefan-Boltzmann constant.

$$E=\varepsilon\sigma T^4 \qquad \text{Formula 1}$$

Table I illustratively lists radiation coefficients of a variety of common non-metal substances and metal substances. According to Table I, most of the non-metal substances have a radiation coefficient more than 0.9, while most of the metal substances have a radiation coefficient less than 0.3. Therefore, in the thermal image shot by the thermal image sensing system, if the radiation coefficient of the object (especially a metal substance) is not corrected, the surface temperature of the metal substance will be underestimated a lot.

TABLE I

| Non-metal substance | Radiation coefficient | Metal substance | Radiation coefficient |
|---|---|---|---|
| Asbestos | 0.95 | Aluminium (not oxidized) | 0.02 to 0.1 |
| Ceramic | 0.95 | Aluminium (oxidized) | 0.02 to 0.4 |
| Cloth | 0.95 | Lead (polished) | 0.05 to 0.1 |
| Glass (flat) | 0.85 | Lead (coarse) | 0.4 |
| Paint (alcohol-free) | 0.9 to 0.95 | Lead (oxidized) | 0.2 to 0.6 |
| Paper (any color) | 0.95 | Brass (polished) | 0.01 to 0.05 |
| Plastic (light-proof) | 0.95 | Brass (oxidized) | 0.5 |
| Rubber | 0.95 | Zinc (polished) | 0.03 |
| Wood (natural) | 0.9 to 0.95 | Zinc (oxidized) | 0.1 |

In order to improve the problem that the surface temperature of the metal substance is underestimated, embodiments of the disclosure provide a thermal image sensing system and a thermal image sensing method, which can calculate the surface temperature of the metal substance by correcting the radiation coefficient of the metal substance. The detailed method is explained later.

Figure 1:
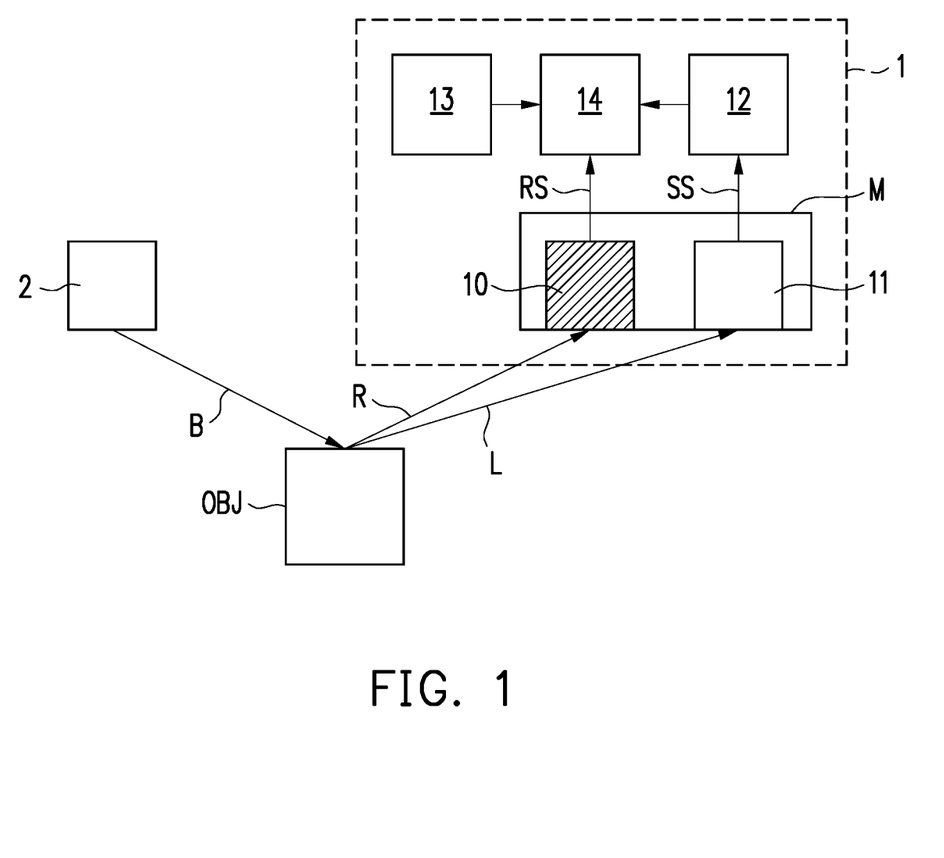
FIG. 1 is a schematic diagram of a thermal image sensing system according to a first embodiment of the disclosure.

FIG. 1 is a schematic diagram of a thermal image sensing system 1 according to a first embodiment of the disclosure. Referring to FIG. 1, the thermal image sensing system 1 includes at least one thermal sensor (such as a thermal sensor 10), at least one light sensor (such as a light sensor 11), an image identification module 12, a storage module 13 and a computing module 14. In the present embodiment, as shown in FIG. 1, the quantities of the thermal sensor and the light sensor which are included in the thermal image sensing system 1 may be both equal to one, but the quantity of the thermal sensor and the quantity of the light sensor may be changed as required, and are not limited to those shown in FIG. 1.

The at least one thermal sensor (such as the thermal sensor 10) is suitable for sensing thermal radiation R emitted by an object OBJ. For example, the thermal sensor 10 may be an infrared light sensor, and is suitable for sensing infrared light from the object OBJ and generating a thermal radiation image signal RS correspondingly, but the type of the thermal sensor 10 is not limited thereto.

The at least one light sensor (such as the light sensor 11) is suitable for sensing visible light L reflected by the object OBJ, receiving the visible light L, and generating at least one visible light image signal SS correspondingly. For example, the light sensor 11 may be a photodiode, a charge coupled device (CCD) or a complementary metal oxide semiconductor (CMOS) element, but it is not limited to thereto.

In the present embodiment, as shown in FIG. 1, the light sensor 11 uses ambient light B to sense a visible light image of the object OBJ. Specifically, the light sensor 11 senses the visible light L reflected by the object OBJ under the illumination of the ambient light B emitted by an ambient light source 2. The ambient light source 2 may be the sun, outdoor lighting or indoor lighting, and the like. However, in another embodiment, the thermal image sensing system 1 may further include at least one light source (e.g., a visible light source) for visible light image sensing. In this way, the light sensor 11 may also be operated in a dim environment.

In the present embodiment, as shown in FIG. 1, the thermal sensor 10 and the light sensor 11 may form a dual lens module M, but the disclosure is not limited thereto. In another embodiment, the thermal sensor 10 and the light sensor 11 may be independently disposed/erected.

The image identification module 12 is suitable for receiving the at least one visible light image signal SS generated by the at least one light sensor (such as the light sensor 11) and determining a material of the object OBJ according to the at least one visible light image signal SS. For example, the image identification module 12 may analyze parameters such as a surface appearance and/or a color of the object OBJ by using artificial intelligence (AI) or an algorithm, so as to determine the material of the object OBJ.

The image identification module 12 may be implemented as a software module, a firmware module, or a hardware circuit. For example, the image identification module 12 may include at least one graphics processing unit (GPU) or similar processing chip to perform machine vision-based image identification. Alternatively, in one embodiment, the image identification module 12 is a program code that may be loaded into the storage module 13 and executed by the computing module 14 or a processor. In addition, the image identification module 12 may have an AI structure such as machine learning and may continuously improve the image identification performance through training.

The storage module 13 stores a radiation coefficient of the material of the object OBJ, but is not limited thereto. In one embodiment, the storage module 13 may store the radiation coefficients of various materials/substances and other desired information. For example, the storage module 13 may be a volatile storage medium or a non-volatile storage medium in an electronic device. The volatile storage medium may be a random access memory (RAM), and the non-volatile storage medium may be a read only memory (ROM), a solid state hard disk (SSD), or a hard disk (HDD). In one embodiment, the storage module 13 may also be a database stored in a cloud.

The computing module 14 calculates a surface temperature of the object OBJ according to the radiation coefficient of the material of the object OBJ and the thermal radiation R emitted by the object OBJ. For example, the computing module 14 may include a central processing unit (CPU) or other programmable general-purpose or special-purpose microprocessors, digital signal processors (DSPs), programmable controllers, application specific integrated circuits (ASICs), programmable logic devices (PLDs), or other similar devices or a combination of these devices.

Figure 2:
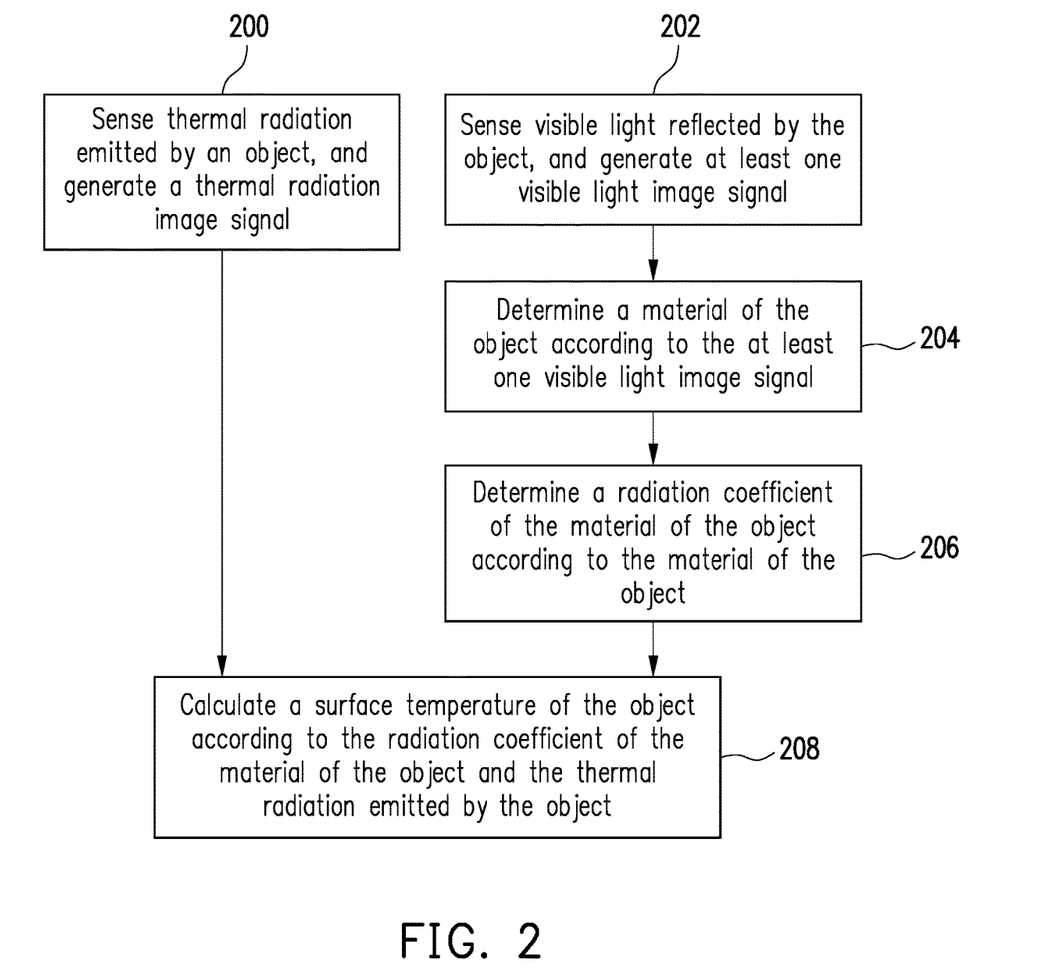
FIG. 2 is a schematic diagram of a thermal image sensing method according to one embodiment of the disclosure.

FIG. 2 is a schematic diagram of a thermal image sensing method 20 according to one embodiment of the disclosure. Referring to FIG. 2, the thermal image sensing method 20 includes the following steps: sensing thermal radiation emitted by an object, and generating a thermal radiation image signal correspondingly (step 200); sensing visible light reflected by the object, and generating at least one visible light image signal correspondingly (step 202); determining a material of the object according to the at least one visible light image signal (step 204); determining a radiation coefficient of the material of the object according to the material of the object (step 206); and calculating a surface temperature of the object according to the radiation coefficient of the material of the object and the thermal radiation emitted by the object (step 208).

In step 200, a thermal sensor may be used to sense the thermal radiation emitted by the object, so as to acquire a thermal image of the object. In step 202, a light sensor may be used to sense the visible light reflected by the object, so as to acquire a visible light image of the object. In step 204, an image identification module may determine the material of the object according to the visible light image. For example, analysis may be performed according to parameters such as a surface appearance and/or a color of the object in the visible light image. For example, the material of the object may be determined according to the metal luster of the object in the visible light image, but it is not limited thereto. In step 206, the image identification module may search radiation coefficient information stored in a storage module for the radiation coefficient of the material of the object. In step 208, a computing module may calculate (such as substituting Formula 1) the surface temperature of the object according to the found radiation coefficient and the thermal radiation emitted by the object, and optimize/correct the thermal image acquired in step 200 accordingly.

For example, feature matching (such as matching of positions and object sizes) may be performed through the thermal image acquired by the thermal sensor and the visible light image acquired by the light sensor, and the image identification module is used to identify the object in the visible light image, determine the material of the object, and find the radiation coefficient of the material of the object. Then, a temperature of a region where a metal substance is located in the thermal image of step 200 is optimized by the computing module, so that the surface temperature of the object displayed by the optimized thermal image conforms to an actual surface temperature of the object. In this way, compared to obtaining of the thermal image of the object only by the thermal sensor, the obtaining of the thermal image of the object by the cooperation of the thermal sensor and the light sensor can effectively avoid underestimation of the surface temperature of the metal substance, and the surface temperature of the object display by the thermal image is relatively consistent with the actual surface temperature of the object.

Figure 3:
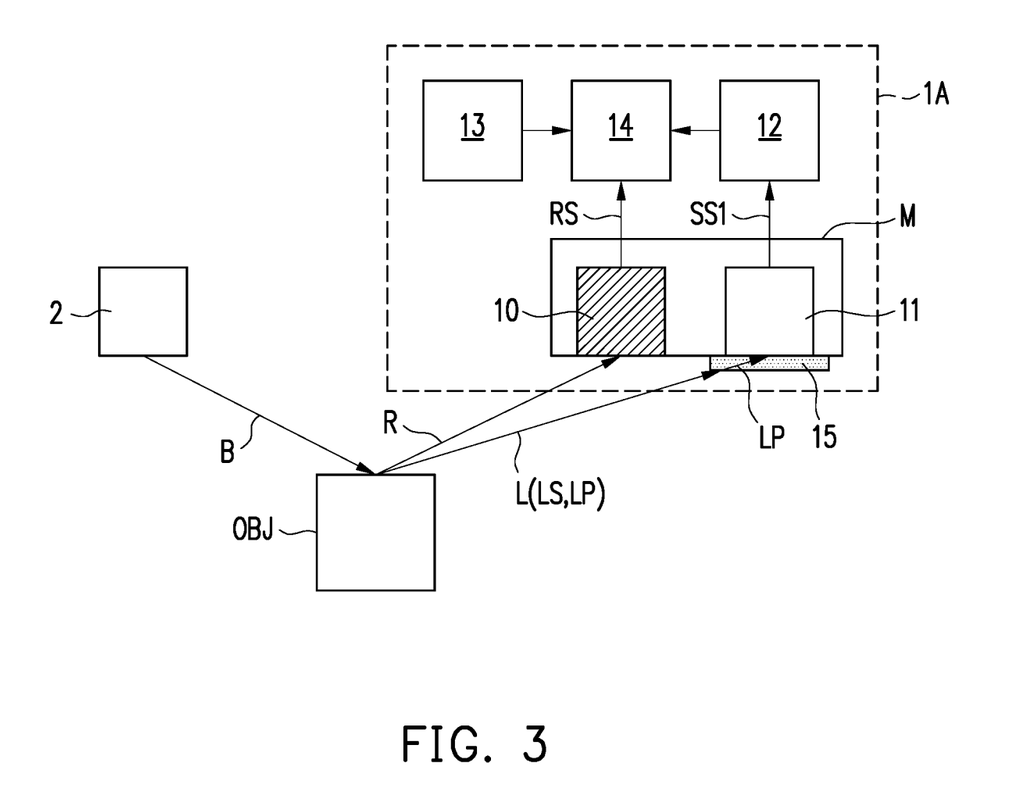
FIG. 3 is a schematic diagram of a thermal image sensing system according to a second embodiment of the disclosure.

FIG. 3 is a schematic diagram of a thermal image sensing system 1A according to a second embodiment of the disclosure. Referring to FIG. 3, a main difference between the thermal image sensing system 1A and the thermal image sensing system 1 of FIG. 1 is that the thermal image sensing system 1A further includes at least one polarizer (such as a polarizer 15). In the present embodiment, as shown in FIG. 3, the thermal image sensing system 1A includes one polarizer, and the polarizer 15 is disposed between the object OBJ and the at least one light sensor (such as the light sensor 11). However, the quantity of the polarizer included in the thermal image sensing system 1A may be changed as required, and the polarizer 15 may also be disposed in the at least one light sensor (such as the light sensor 11).

The polarizer 15 is suitable for filtering light having a specific polarization direction in visible light L. For example, s-polarized light has a relatively high reflectivity on a metal surface, which tends to generate a white picture (a highly reflective region) in the visible light image. If the white picture shields the image of the object, the difficulty of material identification will be increased, or the accuracy of the material identification will be reduced. Therefore, the polarizer 15 may be a polarizer that filters the s-polarized light LS in the visible light L and allows p-polarized light LP in the visible light L to pass. The polarizer 15 is used to filter the s-polarized light LS in the visible light L and allow the p-polarized light LP in the visible light L to pass, which contributes to eliminate the highly reflective region, thereby obtaining a relatively clear/complete image (a visible light image) of the object and improving the accuracy of the material identification.

Under the structure provided with the polarizer 15, in step 202 of FIG. 2, the step of sensing the visible light reflected by the object, and generating the at least one visible light image signal may include the following steps: filtering the s-polarized light LS in the visible light L reflected by the object OBJ by using the polarizer 15; and sensing the p-polarized light LP in the visible light L reflected by the object OBJ, and generating a first light signal (such as a visible light image generated by the p-polarized light LP. In FIG. 3, SS1 denotes the first light signal). In addition, in step 204 of FIG. 2, the step of determining the material of the object according to the at least one visible light image signal may include: determining the material of the object OBJ according to the first light signal SS1. Since the visible light image generated by the p-polarized light LP may have a clear/complete image of the object, it contributes to improving the accuracy of the material identification.

Figure 4:
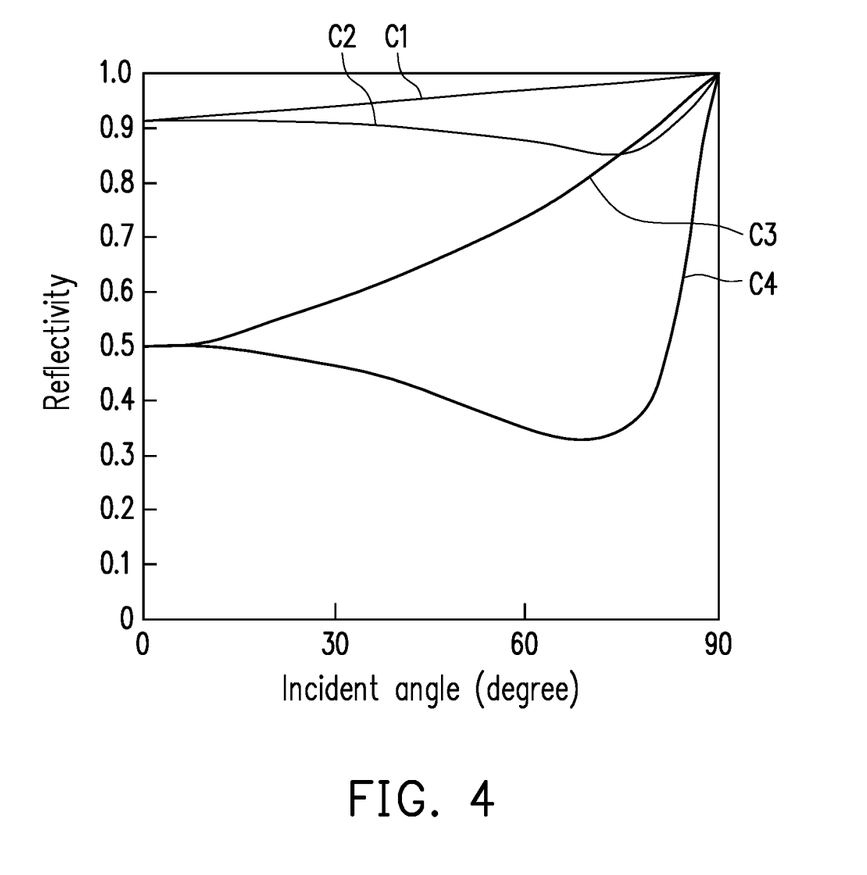
FIG. 4 is a relational graph of incident angle-reflectivity of visible light reflected by a metal substance.

FIG. 4 is a relational graph of incident angle-reflectivity of visible light reflected by a metal substance. Since light in different polarization directions has different reflectivity to the metal substance, the material identification may be performed by the reflectivity of the light in the different polarization directions to the metal substance. In FIG. 4, a curve C1 indicates the reflectivity of silver (Ag) to the s-polarized light. A curve C2 indicates the reflectivity of the Ag to the p-polarized light. A curve C3 indicates the reflectivity of copper (Cu) to the s-polarized light. A curve C4 indicates the reflectivity of the Cu to the p-polarized light. It can be seen from FIG. 4 that for the same metal substance, when the s-polarized light and the p-polarized light are obliquely incident to the metal substance, the s-polarized light and the p-polarized light have different reflectivity. Furthermore, for different metal substances, the p-polarized light (or s-polarized light) that is obliquely incident to the metal substances has different reflectivity. Therefore, the reflectivity of the p-polarized light and/or the s-polarized light may be used to assist in the material identification, thereby improving the accuracy of the material identification.

Figure 5:
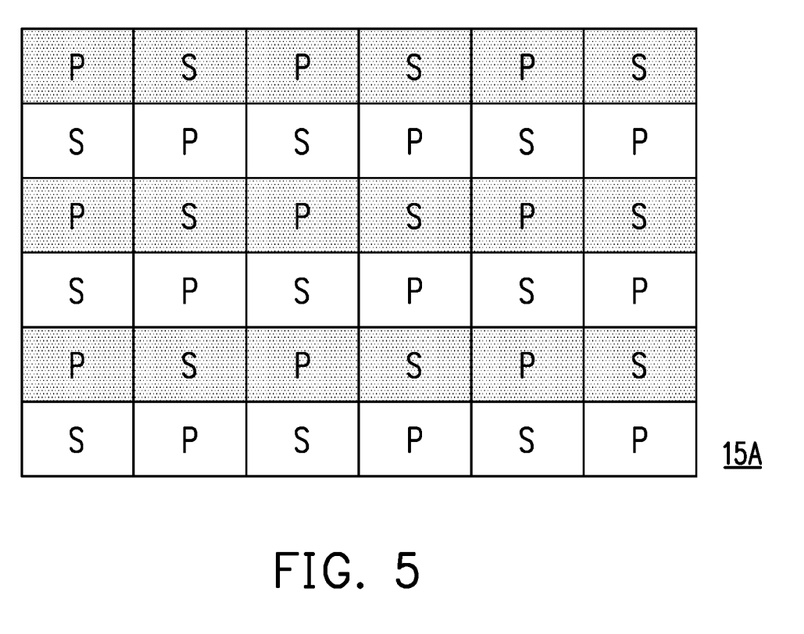
FIG. 5 and FIG. 6 are respectively two other schematic front diagrams of a polarizer in FIG. 3.

FIG. 5 and FIG. 6 are respectively two other schematic front diagrams of a polarizer in FIG. 3. Referring to FIG. 5, main differences between a polarizer 15A and the polarizer 15 of FIG. 3 are as follows. In FIG. 3, the polarizer 15 is a single kind of polarizer suitable for allowing the p-polarized light to pass and filtering the s-polarized light. In FIG. 5, the polarizer 15A is formed by combining two kinds of polarizers. Specifically, the polarizer 15A includes a plurality of first portions P suitable for allowing the p-polarized light to pass and filtering the s-polarized light, and a plurality of second portions S. The plurality of second portions S is suitable for allowing the s-polarized light to pass and filtering the p-polarized light. The plurality of first portions P and the plurality of second portions S may be arranged into an array and disposed in the at least one light sensor (such as the light sensor 11 of FIG. 3) and corresponding to pixels of the light sensor 11.

Figure 6:
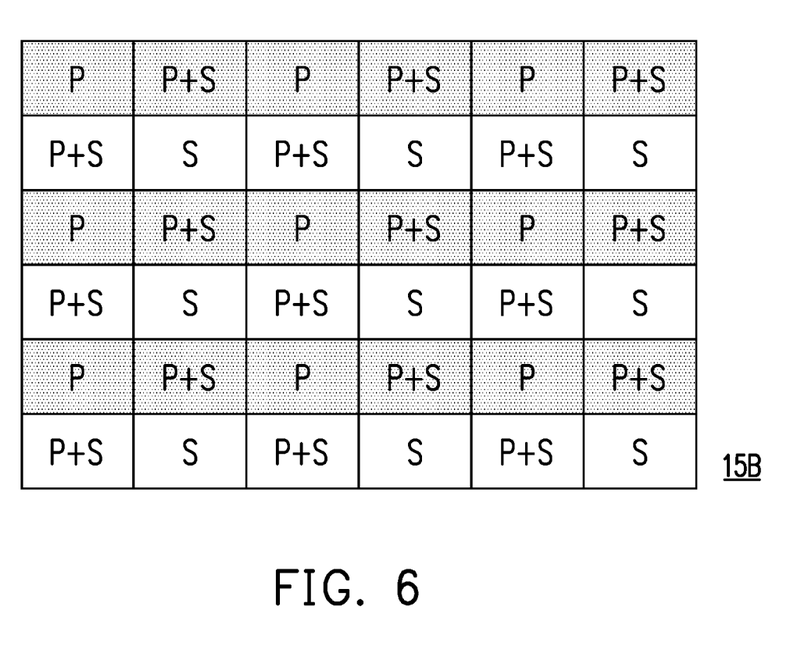

Referring to FIG. 6, main differences between a polarizer 15B and the polarizer 15A of FIG. 5 are as follows. In FIG. 6, the polarizer 15B is formed by combining three kinds of polarizers. Specifically, in addition to the plurality of first portions P and the plurality of second portions S, the polarizer 15B further includes a plurality of third portions P+S. The plurality of third portions P+S is suitable for allowing the p-polarized light and the s-polarized light to pass, or the plurality of third portions P+S is suitable for filtering the p-polarized light and the s-polarized light. In addition, the plurality of first portions P, the plurality of second portions S and the plurality of third portions P+S may be arranged into an array and disposed in the at least one light sensor (such as the light sensor 11 of FIG. 3) and corresponding to pixels of the light sensor 11.

Under the structure provided with the polarizer 15A or the polarizer 15B, the material identification is performed by the visible light image captured by the single light sensor (such as the light sensor 11 of FIG. 3). Specifically, as shown in FIG. 4, for the same metal substance, when the s-polarized light and the p-polarized light are incident to the metal substance at an incident angle that is more than or equal to 10 degrees and less than or equal to 90 degrees, the s-polarized light and the p-polarized light have different reflectivity. Therefore, under the structure provided with the polarizer 15A or the polarizer 15B, the ambient light source 2 may be disposed obliquely above the object OBJ, so that the ambient light B is incident to the metal substance at an incident angle that is more than or equal to 10 degrees and less than or equal to 90 degrees, and the light sensor 11 is correspondingly disposed to sense the visible light L reflected by the object OBJ. A contrast difference between the s-polarized light and the p-polarized light assists in determining the material of the metal.

Figure 7:
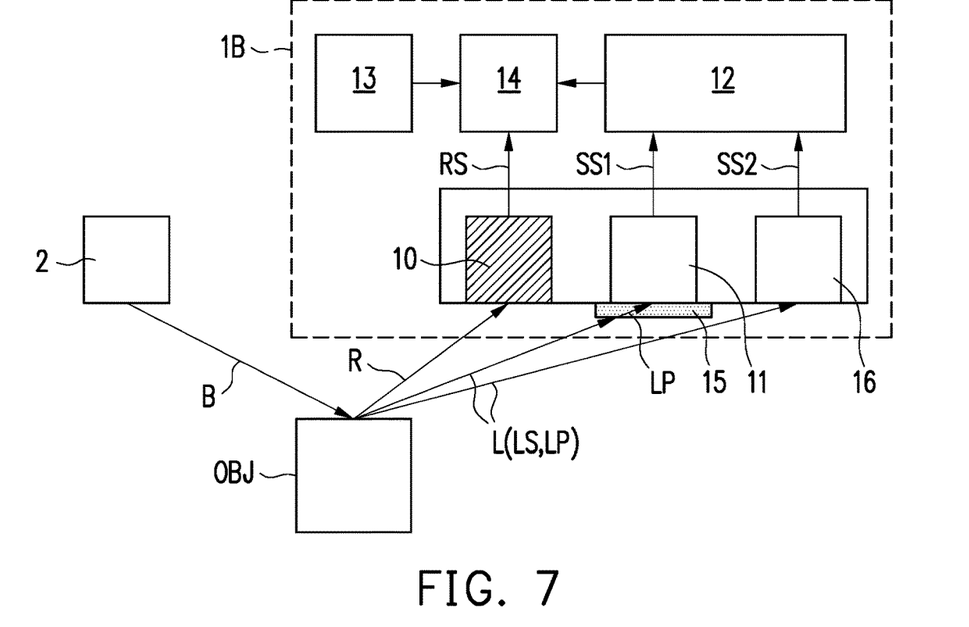
FIG. 7 to FIG. 9 are respectively schematic diagrams of thermal image sensing systems according to a third embodiment to a fifth embodiment of the disclosure.
Figure 8:
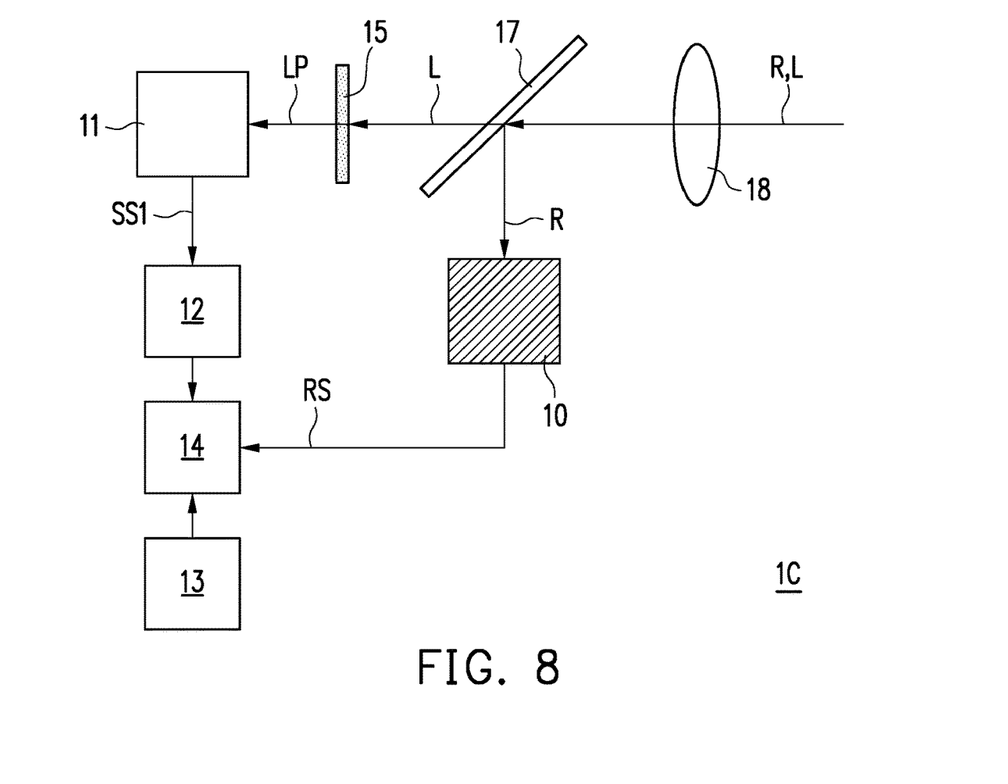
Figure 9:
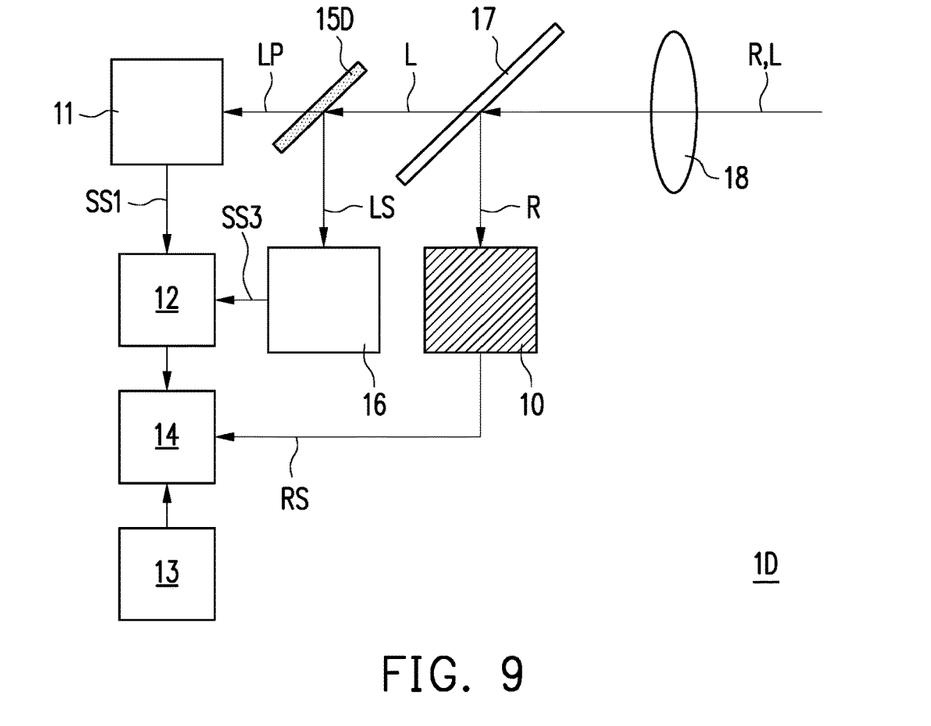

FIG. 7 to FIG. 9 are respectively schematic diagrams of a thermal image sensing system 1B to a thermal image sensing system 1D according to a third embodiment to a fifth embodiment of the disclosure. Referring to FIG. 7, a main difference between the thermal image sensing system 1B and the thermal image sensing system 1A of FIG. 3 is that the thermal image sensing system 1B includes a plurality of light sensors. Specifically, the thermal image sensing system 1B includes a first light sensor (such as the light sensor 11) and a second light sensor 16. The at least one polarizer (such as the polarizer 15) is disposed on a path of the visible light L transmitted toward the first light sensor (such as the light sensor 11), and the at least one polarizer is suitable for allowing the p-polarized light to pass and filtering the s-polarized light, or the at least one polarizer is suitable for allowing the s-polarized light to pass and filtering the p-polarized light.

In the present embodiment, the polarizer 15 is suitable for allowing the p-polarized light to pass and filtering the s-polarized light. In step 202 of FIG. 2, the step of sensing the visible light reflected by the object, and generating the at least one visible light image signal may include the following steps: filtering the s-polarized light LS in the visible light reflected by the object OBJ by using the polarizer 15; sensing the p-polarized light LP in the visible light L reflected by the object OBJ by using the first light sensor (such as the light sensor 11) and generating a first light signal SS1; and sensing the p-polarized light LP and the s-polarized light LS in the visible light L reflected by the object OBJ by using the second light sensor 16 and generating a second light signal SS2. In addition, in step 204 of FIG. 2, the step of determining the material of the object according to the at least one visible light image signal may include: determining the material of the object OBJ according to the first light signal SS1 and the second light signal SS2. Specifically, the first light signal SS1 including the p-polarized light LP may be removed from the second light signal SS2 including the p-polarized light LP and the s-polarized light LS to acquire a light signal only including the s-polarized light LS, and the material identification is performed by the reflectivity of the p-polarized light LP and the s-polarized light LS.

Referring to FIG. 8, a main difference between the thermal image sensing system 1C and the thermal image sensing system 1A of FIG. 3 is as follows. In FIG. 8, the thermal sensor 10 and the light sensor 11 are independently disposed/erected. In addition, the thermal image sensing system 1C further includes a light splitting element 17. The light splitting element 17 is suitable for reflecting one of the infrared light (the thermal radiation R) and the visible light L, and allowing the other one of the infrared light (the thermal radiation R) and the visible light L to penetrate. Furthermore, the at least one polarizer (such as the polarizer 15) is disposed on a path of the visible light L transmitted from the light splitting element 17 toward the at least one light sensor (such as the light sensor 11).

In the present embodiment, the light splitting element 17 is suitable for reflecting the infrared light (the thermal radiation R) and allowing the visible light L to penetrate, and the polarizer 15 is disposed between the light splitting element 17 and the light sensor 11. However, in another embodiment, the polarizer 15 may also be disposed in the light sensor 11. In addition, the light splitting element 17 may also reflect the visible light L and allow the infrared light (the thermal radiation R) to penetrate. Correspondingly, the positions of the thermal sensor 10 and the light sensor 11 are interchanged, and the polarizer 15 is disposed between the light splitting element 17 and the light sensor 11 or disposed in the light sensor 11.

The thermal image sensing system 1C may include other elements according to different requirements. For example, the thermal image sensing system 1C may further include a condensing element 18. The condensing element 18 may provide an effect of converging light, and is suitable for allowing the infrared light (the thermal radiation R) and visible light L to pass. For example, the condensing element 18 may include at least one lens.

In FIG. 8, the polarizer 15 may be a polarizer that filters the s-polarized light LS in the visible light L and allows p-polarized light LP in the visible light L to pass. The polarizer 15 is used to filter the s-polarized light LS in the visible light L and allow the p-polarized light LP in the visible light L to pass, which contributes to eliminate the highly reflective region, thereby obtaining a relatively clear/complete image (a visible light image) of the object and improving the accuracy of the material identification. Alternatively, the polarizer 15 may be substituted by the polarizer 15A of FIG. 5 or the polarizer 15B of FIG. 6.

Referring to FIG. 9, a main difference between the thermal image sensing system 1D and the thermal image sensing system 1C of FIG. 8 is as follows. In FIG. 9, the thermal image sensing system 1D includes a plurality of light sensors. Specifically, the thermal image sensing system 1D may include a first light sensor (such as the light sensor 11) and a second light sensor 16. The at least one polarizer (such as the polarizer 15D) is disposed between the light splitting element 17 and the first light sensor (such as the light sensor 11), and between the light splitting element 17 and the second light sensor 16. The polarizer 15D is suitable for reflecting the s-polarized light LS in the visible light L and allowing the p-polarized light LP in the visible light L to penetrate. The first light sensor (such as the light sensor 11) receives the p-polarized light LP passing through the polarizer 15D, and the second light sensor 16 receives the s-polarized light LS reflected by the polarizer 15D.

The material identification may also be performed by using two light sensors to capture images of different polarized light. Under the structure of FIG. 9, in step 202 of FIG. 2, the step of sensing the visible light reflected by the object, and generating the at least one visible light image signal may include the following steps: separating the s-polarized light LS from the p-polarized light LP in the visible light L reflected by the object OBJ by using the polarizer 15D; sensing the p-polarized light LP in the visible light L reflected by the object OBJ by using the first light sensor (such as the light sensor 11) and generating a first light signal SS1; and sensing the s-polarized light LS in the visible light L reflected by the object OBJ by using the second light sensor 16 and generating a third light signal SS3. In addition, in step 204 of FIG. 2, the step of determining the material of the object according to the at least one visible light image signal may include: determining the material of the object OBJ according to the first light signal SS1 and the third light signal SS3.

Figure 10:
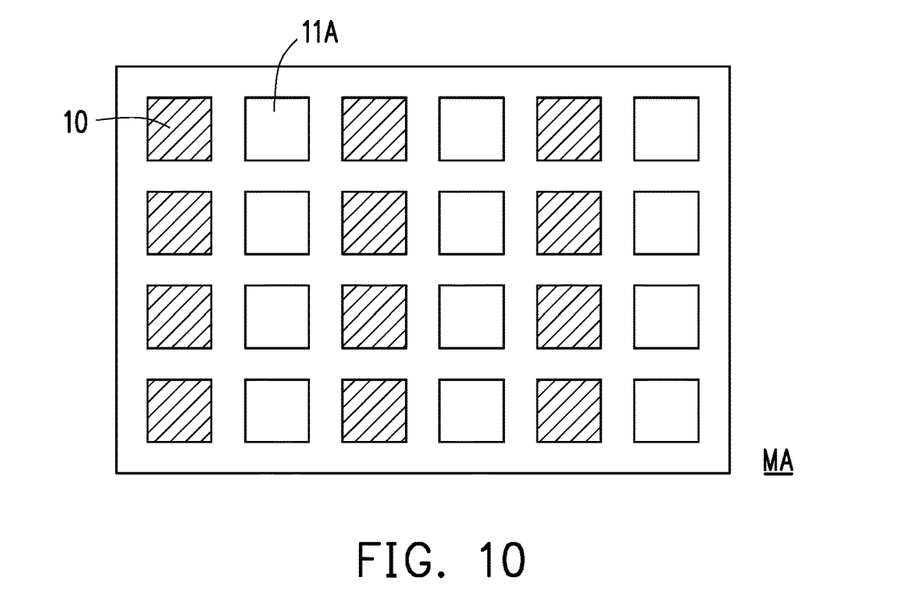
FIG. 10 is a schematic front diagram of a sensing module applied to the thermal image sensing system of the disclosure.

FIG. 10 is a schematic front diagram of a sensing module MA applied to a thermal image sensing system of the disclosure. Referring to FIG. 10, a thermal image sensing system may include a plurality of thermal sensors 10 and a plurality of light sensors 11A, and the plurality of thermal sensors 10 and the plurality of light sensors 11A may be arranged into an array to form the sensing module MA shown in FIG. 10. In the sensing module MA, each of the light sensors 11A may include a plurality of sub-pixels, such as red sub-pixels, green sub-pixels, and blue sub-pixels, but it is not limited thereto. In addition, each of the light sensors 11A is selectively provided with a polarizer (not shown), and the plurality of polarizers of the plurality of light sensors 11A may use the design (in which the s-polarized light is filtered or the p-polarized light is filtered) of the polarizer 15 in FIG. 3, the design (in which the plurality of first portions P and the plurality of second portions S are arranged into the array) of the polarizer 15A in FIG. 5, or the design (in which the plurality of first portions P, the plurality of second portions S and the plurality of third portions P+S are arranged into the array) of the polarizer 15B in FIG. 6.

Based on the above, the thermal image sensing system and the thermal image sensing method of the disclosure may use the visible light image to determine the material of the object, and thus correct the surface temperature of the metal substance, so that the corrected/optimized surface temperature of the object displayed by the thermal image conforms to the actual surface temperature of the object. In one embodiment, the highly reflective region may be eliminated by the arrangement of the at least one polarizer, and the relatively clear/complete image of the object (the visible light image) may be obtained, thereby improving the accuracy of the material identification. In one embodiment, the combined design of various polarizers may assist in determining the material of the metal substance. In one embodiment, the arrangement of the plurality of light sensors and the single polarizer may assist in determining the material of the metal substance. In one embodiment, the thermal image sensing system may include the sensing module formed by arraying the plurality of thermal sensors and the plurality of light sensors.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:
1. A thermal image sensing method, comprising:
sensing thermal radiation emitted by an object and generating a thermal radiation image signal correspondingly;
sensing a visible light reflected by the object and generating at least one visible light image signal correspondingly;
determining a material of the object according to the at least one visible light image signal;
determining a radiation coefficient of the material of the object according to the material of the object; and
calculating a surface temperature of the object according to the radiation coefficient of the material of the object and the thermal radiation emitted by the object,
wherein the step of sensing the visible light reflected by the object and generating the at least one visible light image signal correspondingly comprises:
filtering s-polarized light in the visible light reflected by the object; and
sensing p-polarized light in the visible light reflected by the object and generating a first light signal, and
wherein the step of determining the material of the object according to the at least one visible light image signal comprises:
determining the material of the object according to the first light signal.

2. The thermal age sensing method according to claim 1, wherein the step of sensing the visible light reflected by the object and generating the at least one visible light image signal correspondingly further comprises:
sensing the p-polarized light and the s-polarized light in the visible light reflected by the object and generating a second light signal, wherein the material of the object is determined according to both of the first light signal and the second light signal.

3. A thermal image sensing method, comprising:
sensing thermal radiation emitted by an object and generating a thermal radiation image signal correspondingly;
sensing a visible light reflected by the object and generating at least one visible light image signal correspondingly;
determining a material of the object according to the at least one visible light image signal;
determining a radiation coefficient of the material of the object according to the material of the object; and calculating a surface temperature of the object according to the radiation coefficient of the material of the object and the thermal radiation emitted by the object, wherein the step of sensing the visible light reflected by the object and generating the at least one visible light image signal correspondingly comprises:

separating s-polarized light from p-polarized light in the visible light reflected by the object;

sensing the p-polarized light in the visible light reflected by the object and generating a first light signal; and sensing the s-polarized light in the visible light reflected by the object and generating a third light signal, wherein the step of determining the material of the object according to the at least one visible light image signal comprises:

determining the material of the object according to the first light signal and the third light signal.

\* \* \* \* \*